Oct. 29, 1929.   G. H. BEAUMONT ET AL   1,733,365
VEHICLE SPRING
Filed Jan. 19, 1927
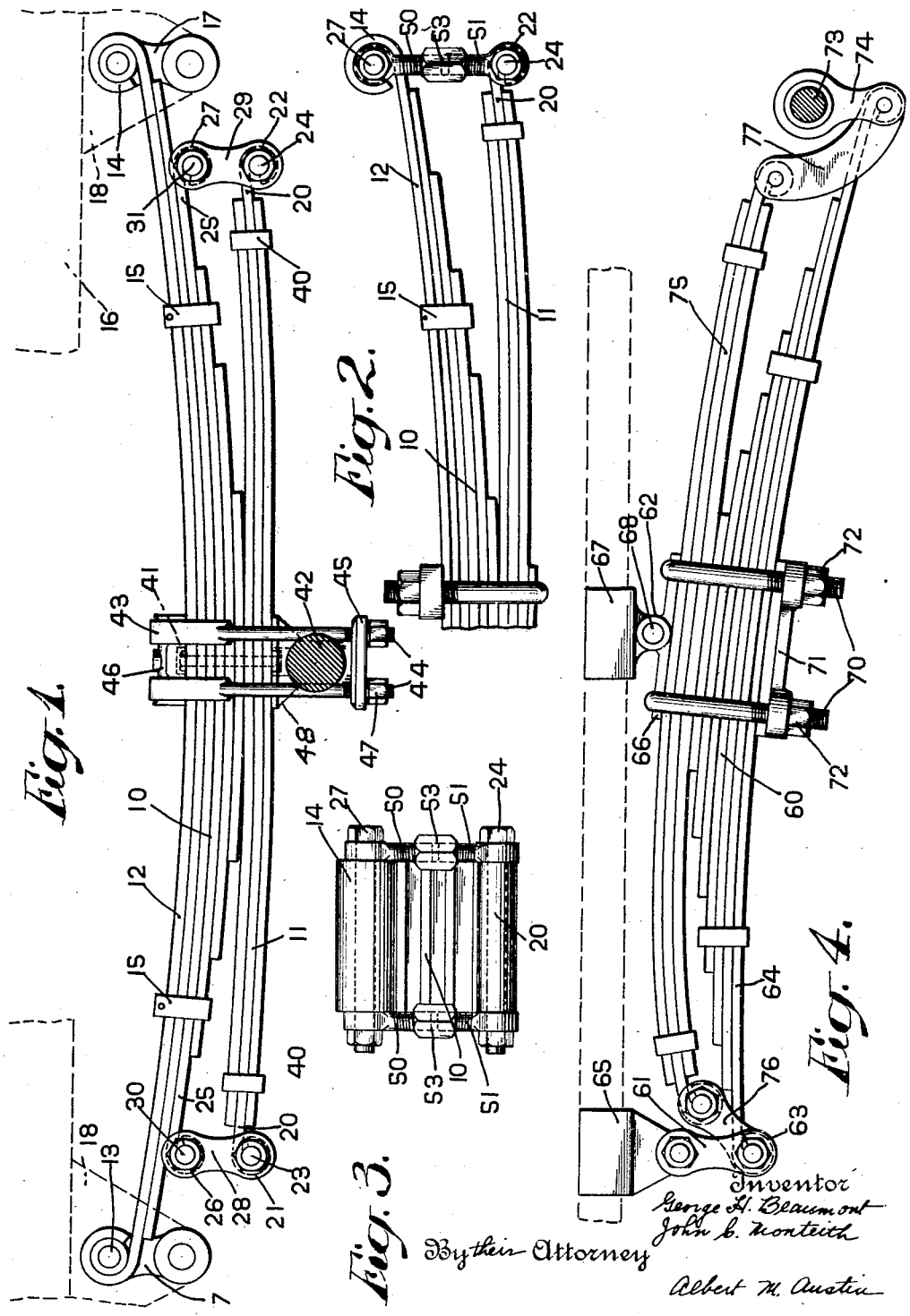

Patented Oct. 29, 1929

1,733,365

UNITED STATES PATENT OFFICE

GEORGE H. BEAUMONT AND JOHN C. MONTEITH, OF CLEVELAND, OHIO, ASSIGNORS TO STERLING SPRING COMPANY, OF CLEVELAND, OHIO, A CORPORATION OF DELAWARE

VEHICLE SPRING

Application filed January 19, 1927. Serial No. 161,994.

This invention relates to spring members, and, more particularly, to vehicle chassis springs which are capable of operating without causing undue vibration of the chassis.

The invention further relates to a vehicle chassis spring in which free oscillations due to the sprung parts vibrating in synchronism with the road shocks are eliminated, the spring having an effective length in compression which differs from that in recoil.

A vehicle chassis mounted on springs which possess practically identical characteristics in both compression and recoil will have a definite free period of vibration depending upon the characteristics of the springs and the weight of the sprung parts. Consequently, when road shocks are received at proper intervals to cause the chassis to vibrate at its natural free period, the movement of the chassis will increase at each successively shock until the extent of movement becomes sufficiently great to cause discomfort to passengers or even injury to the spring itself.

In vehicles equipped with extremely resilient tires, commonly referred to as balloon tires, which in themselves act as an additional spring, the inter-action between the chassis springs and the tires is frequently such as to cause vibrations of an excessive amplitude which may only be overcome by altering the speed of the vehicle itself.

In considering the riding qualities of a spring it is also necessary to take into account the property of the spring in passing to the chassis road shocks which are received by the wheels. A soft spring, that is, one which will respond readily to road shocks, will also transmit these shocks to the chassis practically undiminished, whereas a comparatively stiff spring which will not transmit shocks as readily is incapable of cushioning or absorbing the shocks. In a practical form of spring the proper balance must be obtained between the spring and chassis, that is, the spring must absorb the road shocks but should not transmit these road shocks to the vehicle chassis.

The present invention provides a spring member which may be readily compressed in response to a road shock and which is capable of largely absorbing the shocks and transmitting them only in greatly diminished form to a vehicle chassis.

This is accomplished by providing a compound spring in which the various leaves are divided into two groups, one group may contain the greater portion of leaves and constitute the normal load carrying spring of the vehicle. The other group of leaves which may comprise a single leaf or any desired number to obtain the required characteristics, is rigidly attached to the first group of leaves at two points but is distorted from its normal position of rest in such a direction as to operate against the leaves of the main load carrying spring. The second group operates to impress a false load upon the main load carrying spring thereby assisting the main spring in compression but opposing it in recoil.

A compound spring such as above described possesses characteristics in compression different from those in recoil. In general, by assisting the downward movement of the load carrying spring, the second group of leaves introduces properties similar to that of shortening the spring and by retarding the upward movement of the main spring in recoil the effect produced is that of lengthening the main spring.

The free natural period of vibration of a spring is dependent not only on the compression resistance thereof but also upon the effective length, consequently the above described spring will have different free natural periods of vibration in compression and in recoil. The tendency of the spring as a whole to oscillate at either of these frequencies is therefore reduced, the spring having practically no marked free period of vibration.

A spring of this character operating in connection with balloon tires tends to absorb the shocks transmitted by the tires without passing these shocks to the chassis itself. The chassis is therefore prevented from vibrating in synchronism with road shocks or from being forced into oscillations of excessive amplitude by continuously and progressively applied road shocks.

Should the compression of the spring be sufficient to cause the second group of leaves to pass their free position the leaves of this group will then assist the load carrying group in sustaining the weight of the vehicle. The second or auxiliary group of leaves, therefore, in addition to opposing the recoil of the main group when distorted above its normal position of rest, will exert a cushioning effect when below this position and thereby enable the spring to carry a greater load.

In order to accomplish both of these objects it is necessary to positively attach the auxiliary group of springs to the main group in order that the movement of one of these springs will correspond exactly to the movement of the other. Were this not done the two springs would act over only a portion of the cycle lying entirely on one side of the position of rest of the auxiliary spring. Springs constructed in this manner combine two features, viz: cushioning road shocks and preventing undue vibrations, and acting as stiffening means when an excessive load is applied to the vehicle.

Should such a spring assembly be attached to a vehicle in which the normal unloaded weight is comparatively small as compared to the loaded weight, as, for example, in heavy trucks or busses, it may be desirable to construct the main group of springs of a smaller number of leaves than the auxiliary group whereby the compression resistance of the main group would be less than that of the group opposed thereto.

In this case the main group of leaves is capable of supporting the unloaded weight of the vehicle, the combination of two leaves acting when the vehicle is unloaded to prevent rebound and to prevent undue oscillations as above described. When a load is applied to the vehicle, however, the auxiliary group is forced below its free position and will then assist the main spring in supporting the load. It may be desirable in vehicles of this type to have the unloaded weight supported practically entirely by the main or lighter group of leaves and the weight of the load supported practically entirely by the auxiliary group.

When such a spring is at rest the main group of leaves being of lower compression resistance than the auxiliary group will be distorted a greater distance from their normal position of rest. It would, therefore, take a comparatively small increase in load to force the auxiliary springs below their normal position and thereby bring them into action for assisting in supporting the load.

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawings forming a part thereof, in which Fig. 1 is an elevation of a compound chassis spring constructed in accordance with this invention;

Fig. 2 shows a modification thereof in which the two spring members are connected by an adjustable link;

Fig. 3 is an end view of the adjustable link mechanism disclosed in Fig. 2; and, Fig. 4 shows the compound spring applied to a cantilever suspension.

Like reference characters denote like parts in the several figures of the drawings.

In the following description and in the claims parts will be identified by specific names for convenience, but they are intended to be as generic in their application to similar parts as the art will permit.

Referring to Fig. 1 more specifically, the invention is shown as applied to a semi-elliptic spring which includes an upper group of leaves 10 and a lower group 11. The top leaf 12 of group 10 may be extended at its two ends to form knuckles 13 and 14 for facilitating connection to a vehicle chassis 16. The spring may be attached to a chassis 16 in any convenient manner, as by links 17 extending between knuckles 13 and 14 and extensions 18 on the chassis. Links 17 are preferably pivotally connected to the knuckles and to the chassis to allow free movement of the spring in use.

The remaining leaves of the upper group 10 are of progressively decreasing length in accordance with the usual method of construction. Clips 15 may be provided for preventing separation of the leaves during recoil, if desired.

The lower group of leaves 11 are shown by way of illustration as comprising three leaves, although the exact number of leaves required will depend upon the particular properties of each leaf and the compression resistance of the entire spring. In the form disclosed the center leaf 20 is extended to form knuckles 21 and 22 at the two ends respectively for receiving shackle bolts 23 and 24.

Knuckles 21 and 22 may be attached to the upper group of leaves 12 in any suitable manner, such as by forming leaf 25 with knuckles 26 and 27 and connecting these knuckles to knuckles 21 and 22 respectively of the lower group of leaves by means of links 28 and 29. Bolts 30 and 31 may be passed through suitable holes in links 28 and 29 for pivotally attaching these links to knuckles 26 and 27. Links 28 and 29 are likewise attached to knuckles 21 and 22 by means of bolts 23 and 24.

The above described connection of the links to the upper and lower groups of leaves should preferably allow pivotal movement of the links around each knuckle and may be provided with means for oiling if desired. Straps 40 may surround the lower group of leaves 11 and prevent separation thereof during movement of the spring.

The various leaves of the two groups 10 and 11 may be rigidly joined at the center as by bolt 41 passing through suitable holes therein. The entire assembly may be attached to a vehicle axle 42 by suitable means such as U-bolts 43 surrounding the various leaves and provided with threaded ends 44 extending through holes in bearing plate 45, the upper portion of which may be suitably shaped to cooperate with axle 42. Bearing 48 may be inserted between the spring assembly and axle 42, said plate being a suitable shape to cooperate with the upper surface of axle 42 and recessed to provide space for the head of bolt 41. Bearing plate 46, provided with a recess to allow space for the head of bolt 41, may be inserted over the top spring leaf, if desired. The assembly may be rigidly clamped together by nuts 47 threaded upon ends 44 of the U-bolts.

The above described spring is so assembled that links 28 and 29 are normally placed under tension. This may be accomplished by designing the lower group of leaves 11 to have a free position so that the ends of these leaves are separated from the upper leaves by a distance greater than the length of the connecting links. When the connections are completed the lower leaves will be distorted from their free position by an amount equal to the difference between the normal separation of the leaves and the length of links 28 and 29.

When so distorted these leaves exert a downward pressure on the upper group of leaves which will cause the upper group to compress until a point of equilibrium is reached. The relative amount of compression of the two sets of leaves in normal position may be predetermined in accordance with the required properties of the completed spring and the spring designed accordingly.

Assuming by way of example that the upper group of leaves is designed to have a compression resistance of 300 pounds per inch, that is, a force of 300 pounds is required to compress the spring 1 inch, the lower group may be designed to have a compression resistance of 100 pounds per inch and placed under a 3-inch reverse compression. A false load of 300 pounds is therefore placed upon the main spring in its normal position, the amount of this load, however, varying in accordance with the distortion of the lower group of leaves for any given position of the spring.

In the form shown in Fig. 2 the lower group of leaves 11 is extended substantially the same distance as the upper group of leaves, the knuckle 22 formed on the central lower leaf 20 being in substantial alignment with knuckle 14 on the upper leaf 12. The two springs may then be connected by means of an adjustable link shown as eye-bolts 50 and 51 having reverse threads which are connected by adjusting nut 53. Knuckle bolts 24 and 27 may be employed for connecting the above mentioned eye-bolts to the respective knuckles of the upper and lower spring.

In this particular type of construction the main knuckle bolt which is employed for attaching the spring to the chassis is also utilized in connecting the two sections of the springs thereby eliminating use of more than one extra bolt for each end of the spring. Furthermore, the adjustable feature provides means for accurately adjusting the distortion of the two springs in accordance with conditions which may arise during use.

The cantilever spring disclosed in Fig. 4 comprises a main group of leaves 60, which may be connected at one end to a chassis by links 61 and may be connected to a chassis at a point intermediate its ends by pivoted connection 62. Link 61 may be connected in the usual manner between knuckle 63 on lower leaf 64 of group 60 and an extension 65 on the chassis frame.

Pivot connection 62 includes plate 66 provided with a suitable bearing for cooperating with a similar bearing in an extension 67 on the chassis, bolt 68 being passed through the two bearings for pivotally connecting the plate 66 to the frame. The spring assembly may be rigidly attached to plate 66 by means of U-bolts 70 which are passed around plate 66 and through openings in the bearing plate 71 below the spring leaves. Suitable nuts 72 may be employed for causing bolt 70 to rigidly clamp the spring leaves between plates 66 and 71. The free end of spring 60 may be attached to an axle 73, by means of connecting link 74.

A second group of leaves 75 may be firmly attached to group 60 by means of the above mentioned U-bolt 70, their free ends being distorted and pivotally connected to the ends of leaves 60 by means of links 76 and 77. Links 76 and 77 have been shown as attached to the respective spring leaves by means of knuckles and knuckle bolts in a manner similar to that disclosed in Fig. 1, although any other well known means for pivotally connecting these elements may be employed.

The above described spring assembly comprises a load carrying spring composed of several leaves which are divided into two groups having different compression characteristics. The two groups of leaves are so connected together that both sets are placed under an initial compression, the relative amount of compression of the two sets depending upon the particular compression characteristics. The set having a lower compression resistance will obviously distort by a greater amount than that having a higher compression resistance when a state of equilibrium is reached.

The assembly as a whole will possess different properties in compression and in recoil, the second group of leaves assisting the first in compression and opposing it in recoil. As pointed out above, this type of construction provides a spring having practically no marked free period of vibration in addition to being capable of readily absorbing road shocks without transmitting these shocks to the vehicle chassis.

The above described spring is particularly desirable on vehicles equipped with balloon tires, inasmuch as it prevents the sprung parts of the vehicle from oscillating in synchronism with the shocks transmitted by the tires.

This invention has been described by way of illustration as comprising a spring in which the main load carrying leaves are greater in number, and have a higher compression resistance than the second group of leaves. This condition may not, however, always be desirable and with certain types of vehicles it may be preferable to form the two groups of leaves of the same compression resistance or even to form the main group in a lower resistance than the second group. The second group of leaves, that is the normal downwardly acting group, may under some conditions become the load carrying portion of the spring while the normal upwardly acting group of leaves operates to control the recoil of the load carrying portion.

Should the main group of leaves be constructed of a lower compression resistance than the auxiliary group, which condition may be desirable in heavy vehicles, the main group then operates to carry the unloaded vehicle whereas the auxiliary group becomes the load carrying section. When the auxiliary group is distorted above its natural free point as would be the case when the vehicle is unloaded, the combination would act in the manner above described to cushion road shocks and prevent excessive vibrations being transmitted to the vehicle. When a sufficient load is applied to compress the auxiliary group of leaves below its free point it will then assist the main spring in carrying the weight of the loaded vehicle.

Were a spring constructed in the usual manner sufficiently strong to carry the weight of the loaded vehicle it would be too stiff to impart proper riding qualities to the vehicle when unloaded, or to effectively cushion road shocks. This spring, therefore, possesses the marked advantage of allowing an unloaded vehicle to ride easily while still being stiff enough to carry the full load when necessary.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with a vehicle chassis, a spring assembly comprising a main load carrying spring and an auxiliary spring, said auxiliary spring having similar characteristics on opposite sides of its free point, and means for interconnecting said springs whereby said auxiliary spring assumes a portion of the load when depressed beyond said free point and, when not so depressed, opposes said main spring.

2. A chassis spring comprising two sets of leaves, one of said sets adapted to support the unloaded weight of a vehicle and the other of said sets having similar characteristics on opposite sides of its free point adapted to assist the first mentioned set in supporting the weight of the loaded vehicle, said sets being connected in mutually opposed relationship whereby when the vehicle is unloaded the second set opposes the movement of the first set during recoil, and whereby when the vehicle is loaded the second set assists the first set in resisting compression.

3. In combination with a vehicle chassis, a load carrying spring connected thereto, said spring comprising a group of leaves, one of said leaves being extended at its end to form a knuckle, means for attaching said knuckle to said chassis, a second set of leaves, one leaf of said second set being extended at its end to form a knuckle, shorter leaves above and below said extended leaf and secured thereto at their free ends and link mechanism interconnecting said first and second mentioned knuckles.

4. A vehicle chassis spring comprising a group of leaves, one of said leaves being extended at its end to form a knuckle adapted for attachment to a vehicle chassis, a second group of leaves, one leaf of said second group being extended at its end to form a knuckle, other leaves above and below said extended leaf and link mechanism interconnecting said two knuckles.

5. A vehicle chassis spring comprising a group of leaves, one of said leaves being extended at its end to form a knuckle adapted for attachment to a vehicle chassis, a second group of leaves having similar characteristics on opposite sides of its free point, one leaf of said second group being extended at its end to form a knuckle, and adjustable link mechanism interconnecting said two knuckles.

6. In combination with a vehicle chassis, a load carrying spring connected thereto, said spring comprising a group of leaves, one of said leaves being extended at its end to form a knuckle, means for attaching said knuckle to said chassis, a second set of leaves, one leaf of said second set being extended at its end to form a knuckle, other leaves of said second set both above and below said extended leaf, a strap securing the ends of said other leaves to said extended leaf and adjustable link mechanism interconnecting said first and second mentioned knuckles.

In testimony whereof we have hereunto set our hands.

GEORGE H. BEAUMONT.
JOHN C. MONTEITH.